Figure 1:
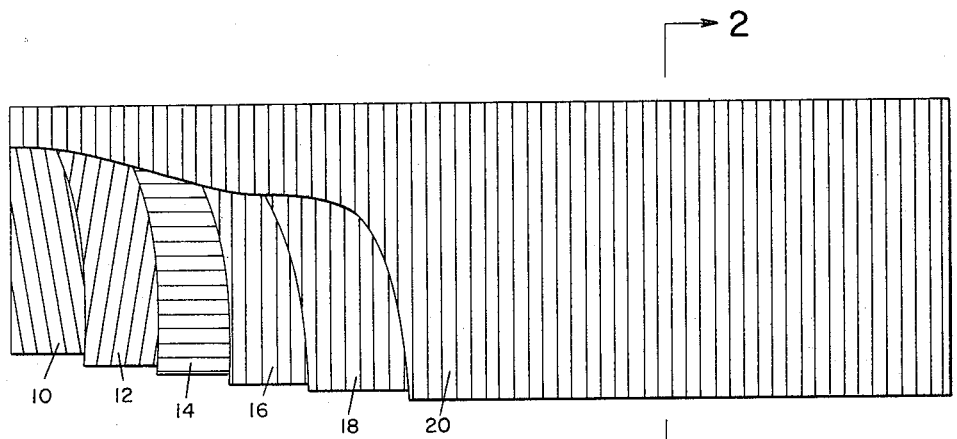

United States Patent [19]
Riggleman et al.

[11] 3,804,259
[45] Apr. 16, 1974

[54] FILAMENT WOUND REVERSE OSMOSIS TUBES

[75] Inventors: Billy M. Riggleman, Wilmington; William L. Young, III, Newark, both of Del.

[73] Assignee: The United States of America as represented by the Secretary of the Interior, Washington, D.C.

[22] Filed: Jan. 23, 1973

[21] Appl. No.: 325,969

[52] U.S. Cl. ............................... 210/490, 156/175
[51] Int. Cl. ............................................. B01d 31/00
[58] Field of Search ............ 210/23, 433, 321, 490; 156/175

[56] References Cited
UNITED STATES PATENTS
3,457,170  7/1969  Havens ........................... 210/490 X Primary Examiner—Frank A. Spear, Jr.
Attorney, Agent, or Firm—Watson T. Scott; Frank A. Lukasik

[57] ABSTRACT

This invention relates to an improved resin-bonded filament wound support tube for membranes employed in reverse osmosis processes. The support tube is in the form of a cured composite structure and contains at least 20–30 percent by weight of a thermosetting resin. The tube has interior plies of helical filament windings which result in a smooth interior surface for the tube and high strength.

13 Claims, 2 Drawing Figures

3,804,259

FILAMENT WOUND REVERSE OSMOSIS TUBES

This invention relates to improved resin-bonded filament-wound support tubes for tubular semi-permeable membranes for use in reverse osmosis processes.

Reverse osmosis is a well-known process for the separation of solvent from a solvent-solute solution using a semi-permeable membrane and high operating pressures. When a semi-permeable membrane is placed between a solvent-solute solution and pure solvent, osmosis occurs. Solvent molecules selectively diffuse through the semi-permeable membrane into the solution. This diffusion increases the pressure on the solution side of the semi-permeable membrane, referred to hereinafter as "membrane," which pressure opposes the flow of solvent through the membrane until a point of equilibrium is reached. At equilibrium the net solvent flow is zero. The pressure at which solvent flow is zero is known as the osmotic pressure of the solution. If a pressure greater than the osmotic pressure is applied to the solution, the solvent flow through the membrane is reversed and solvent flows out of the solution and into the pure solvent. This process, known as reverse osmosis, concentrates the solution and separates pure solvent from the solvent-solute solution.

Reverse osmosis can be used for the desalination of sea water and brackish water. It is also used for other concentration-separation processes such as sewage treatment and sludge dewatering, liquid foodstuff concentration, and heat-sensitive compound purification.

Semi-permeable membranes used in reverse osmosis processes are ultra-thin, substantially monomolecular polymeric films. A particularly useful commercial membrane is the asymmetric Loeb type membrane prepared from cellulose acetate. Because of the fragile nature of these membranes, the membranes must be supported in order to withstand the high pressures of reverse osmosis processes. Reverse osmosis systems using flat plate supported membranes, spiral wound membranes, hollow fiber membranes and tubular supported membranes have been developed. This invention relates to improved support tubes for a tubular reverse osmosis system.

In a tubular reverse osmosis system, the semi-permeable membrane is either inserted into a porous support tube as a liner or it can be coated directly onto the interior surface of a porous support tube. The porous tube acts as a pressure vessel as well as a support for the membrane. The solvent-solute solution flows through the tubular system under a pressure greater than the osmotic pressure of the solution. Solvent selectively passes through the semi-permeable membrane lining the tube, seeps through the porous support tube and is recovered as pure solvent. In the desalination of sea water, sea water is passed through the tubular system at a pressure of from about 1,000 to about 1,500 p.s.i. Water diffuses through the semi-permeable membrane and the porous support tube and is collected.

The support tubes can be made of various porous materials. Porous ceramic, steel and filament-wound tubes have been proposed. Filament-wound tubes of fiber glass impregnated with a thermosetting resin are particularly suitable and have the advantages of high tensile strength and high resistance to corrosion.

In known state-of-the-art filament-wound reverse osmosis support tubes, such as disclosed in U.S. Pat. No. 3,457,170, sufficient porosity is provided by limiting the amount of impregnating resin to about 11–14 percent by weight of the filament-wound structure. The amount of resin must be sufficient to bond the filaments into a unitary structure but insufficient to completely impregnate the open interstitial structure defined by the filaments.

Typically, the known tubes consist of an interior ply of 0° filaments overlaid with a helical ply of 90° filament windings and then an additional ply of 0° filaments. The filaments are impregnated with a minimum amount of resin. Additional exterior plies of helical windings can be included.

The low resin content of the tubes provides insufficient strength for use as support tubes in reverse osmosis processes requiring pressures above about 600–800 p.s.i. Thus, known filament-wound support tubes are not suitable for use in one-stage desalination of sea water, which requires pressures of 1,000–1,500 p.s.i.

It is an object of this invention to provide filament-wound, porous, support tubes for semi-permeable membranes for use in reverse osmosis processes, which have high resin content, low void level, yet high permeability to water.

It is a further object of this invention to provide filament-wound reverse osmosis support tubes having a smooth interior surface.

Still another object of this invention is the provision of filament-wound reverse osmosis support tubes having improved balanced loading characteristics, which are suitable for desalination of sea water.

Other objects and advantages of this invention will be readily apparent from the following detailed description thereof.

In accordance with this invention there is provided an improved porous, resin-bonded, filament-wound composite support tube for membranes employed in reverse osmosis processes, said tube being in the form of a cured composite structure and comprising (a) a plurality of interior plies of helical filament windings impregnated and bonded with a thermosetting resin matrix, said helical windings being at an angle of between about 80° and about 90° with respect to the longitudinal axis of the support tubes; (b) at least one longitudinal ply comprising a plurality of filaments oriented substantially parallel to the longitudinal axis of said tube, said filaments being impregnated with a thermosetting resin matrix, and overlaying the interior plies; and (c) a plurality of outer plies of helical filament windings impregnated and bonded with a thermosetting resin matrix and overlaying said longitudinal ply, said outer plies being at an angle of between about 80° and about 90° with respect to the longitudinal axis of the support tube; said support tube containing at least about 20–30 percent by weight of thermosetting resin.

The resin bonded filament-wound support tube of this invention is further illustrated in the drawings which follow. In the drawings like numbers are used for like parts where applicable.

FIG. 1 is a longitudinal view partly broken away illustrating the windings of the support tube of this invention. The interior helical plies 10 and 12 are overlaid with a longitudinal ply 14. 16, 18 and 20 are the exterior helical plies.

Figure 2:
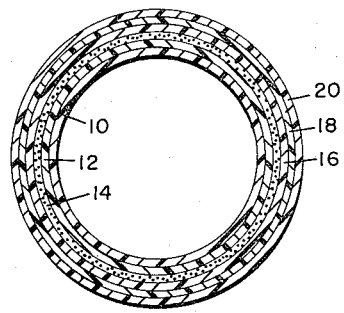

FIG. 2 is a cross-sectional view taken along line 2—2 in FIG. 1.

The filaments used in preparing the filament-wound support tubes of this invention, must have a high tensile strength sufficient to produce a thin-walled tube having a minimum burst strength of 4,000 p.s.i., preferably a burst strength of about 11,000 p.s.i. The filaments must also have a high resistance to degradation in the presence of water. Glass fibers are particularly suitable, but other fibers with the required properties, such as carbon or graphite fibers, can be used.

Any thermosetting resin can be used to impregnate the windings and bond the filaments of the filament-wound support tubes of this invention. The filaments can be impregnated with resin by any suitable method, such as spraying, dipping and the like. Illustrative thermosetting resins include phenolic resins, thermosetting polyester resins, epoxy resins and dual epoxy-phenolic resins.

The improved, porous, resin-bonded filament-wound composite support tubes of this invention are produced by a process comprising:

a. drawing filaments through a bath of thermosetting resin, spreading the resin-wet filaments and helically winding them around a mandrel at an angle of between about 80° and about 90° with respect to the longitudinal axis of the mandrel to form a plurality of interior plies;

b. circumferentially placing around the interior plies a longitudinal ply comprising a plurality of filaments oriented substantially parallel to the longitudinal axis of the mandrel and impregnating the longitudinal ply with termosetting resin;

c. overlaying the longitudinal ply with a plurality of plies by drawing filaments through a bath of thermosetting resin and winding the resin-coated filaments around the longitudinal ply at an angle of between about 80° and about 90° with respect to the longitudinal axis to form the outer plies; and d. curing the thermosetting resin to form a resin-bonded unitary composite tube.

The filament-wound tubes may be produced by other known methods, such as, for example, by dry winding glass filaments followed by vacuum impregnation of the dry winding or by dry winding preimpregnated glass fiber rovings.

The following examples more fully illustrate this invention. In the examples, percentages and parts, where specified, are by weight.

EXAMPLE 1

An eight foot, ½ inch internal diameter filament-wound reverse osmosis support tube is prepared by the following procedure. A lathe-type winding machine having a horizontally mounted rotating mandrel is set to provide a 0.250 inch advance. A resin cup is installed on the carriage. A 0.5 inch 9-foot long mandrel is horizontally mounted on the machine. The mandrel is polished to a highly smooth, glossy surface and is thoroughly cleaned with acetone and then degreased by washing with a cloth soaked in hexane. A release coating of Frekote 33 (a fluorocarbon based mold release agent, available commercially from Frekote, Inc.) is sprayed on the mandrel while it is slowly rotated and the coated mandrel is baked in an oven for ½ hour at 250°F. Three coats of Simonize wax are applied as a secondary release coating.

Three spools of E-type 12-end fiber glass rovings (available commercially from Owens-Corning) are installed on the tensioning devices and threaded through the resin cup. The tensioning device is set to provide ¾ lb. tension per strand.

A horizontal tape of 40 strands of E-type fiber glass is prepared by hand prior to winding.

A thermoset resin mix of Durex 14170 (a novalak, single stage cure phenolic resin, available commercially from Hooker Chemical) and Epon 826 CL (a Bisphenol-A/diglycidylether epoxy resin, containing m-phenylenediamine as a hardener, available commercially from Shell Chemical Co.) is prepared and poured into the resin cup. Two 90° plies are wound on to the mandrel. The mandrel is kept well coated with resin to provide a base coat that will result in a smooth interior surface. The horizontal tape is laid along the length of the mandrel over the first two plies. The horizontal tape is well coated with a fresh batch of the same resin mix. The resin in the resin cup is removed and replaced by Epon 826 CL. Three additional 90° plies are wound over the horizontal tape.

The tube is heated on the machine and when the temperature reaches 60°–66°C. bubbles from the self-gassing of the resin will start to form on the surface and excess resin is removed until the resin hardens. The winding and mandrel are removed from the machine and placed on rotating racks in a preheated forced hot air oven. The tube is cured at 159°C. for 2 hours. Then the tube is removed from the oven and cooled. The finished tube is removed from the mandrel and contains 20 percent by weight of resin.

EXAMPLE 2

A filament-wound reverse osmosis support tube is prepared using the method outlined in Example 1 using E-type fiber glass and Atlac 382-05A polyester resin (a resin consisting of propoxylated Bisphenol-A fumaric acid polyester, and 50 percent styrene and containing tertiary amine promoters, available commercially from Atlas Chemical Industries). To provide sufficient porosity to the support tube, a gassing agent comprising finely ground ammonium carbonate is dispersed in the resin used to impregnate the first two plies. The ammonium carbonate employed is ground by mortar and pestle, dispersed in styrene, and then ball-milled to a fineness of about 10 microns. This gassing agent comprises 4 percent of the resin. The resin content of the finished tube is 24 percent.

EXAMPLE 3

A filament-wound reverse osmosis support tube is prepared as outlined in Example 1 using S-type fiber glass (available commercially from Owen-Corning) and the same dual epoxy--phenolic resin as used in Example 1.

The burst strength of the composite tubes of this invention (Examples 1, 2 and 3) is determined by internally pressurizing 5 or 6 inch diameter composite specimens equipped on the interior with a thin-walled rubber bladder. Using a hydraulic ram at increasing rate of 650 p.s.i. per minute until the burst point is reached. The burst strength of the filament-wound reverse osmosis support tubes of this invention and of the state-of-the-art filament-wound tubes are shown in Table 1. The smoothness of the interior of the filament-wound support tubes prepared in Examples 1, 2 and 3 above and of the state-of-the-art filament-wound tube are compared in Table 1. The roughness measurements is determined using a standardized mechanical microprobe. From this measurement the greatly improved interior surface smoothness of the support tubes of this invention is clearly illustrated.

Table 1

| Support Tube Tested | Roughness (Microinches) | Burst Pressure (p.s.i.) |
|---|---|---|
| Ex. 1 | 45–50 | 10,500 |
| Ex. 2 | 72–80 | 10,500 |
| Ex. 3 | 40–50 | 14,500 |
| *State-of-the-art Support Tube | 270–280 | 5,200 |

Support tube produced by Haven Industries with filament-wound design comprising two interior plies of 0° and three exterior plies of 90° bonded with a phenolic resin.

It is essential that the filament-wound support tubes for a reverse osmosis process be sufficiently prorus to allow the solvent being separated from solution to exude from the interior surface to the outer surface of the support tube. The porosity of the improved support tubes of this invention is provided by self-gassing of the resin or by incorporation of a gassing agent in a resin which is non-gassing. If a gassing agent is employed, it is preferred practice to impregnate only the interior helical plies of the structure with resin containing the gassing agent. Liquid or solid particulate gassing agents which decompose to form a gaseous decomposition product under the influence of heat required to cure the resin matrix can be used. When the filament-wound resin-impregnated composite structure is heated to effect curing, gas evolved by the self-gassing of the resin or by decomposition of the gassing agent travels through the resin to the outer surface of the tube and escapes, thus forming permanent pores in the resin matrix. The incorporation of the gassing agent in the interior helical plies only permits the use of a high resin-to filament ratio, which provides a support tube of improved strength. Gassing must be controlled so that the final resin content of the tube is within the range of at least about 20–30 percent by weight of the tube.

This gassing is controlled principally by choice of resin, or by choice and amount of gassing agent employed with a non-gassing resin.

Illustrative organic gassing agents which can be employed in the thermosetting resin as needed contain azo, nitroso, or sulfonylhydrazo groups which liberate nitrogen when heated to their respective decomposition temperatures. Examples of such organic gassing agents are azoisobutyronitrile, N,N'-dimethyl-N,N'dinitrosoterephthalamide, and 4,4'-oxybis (benzene sulfonyl hydrazine). Illustrative inorganic gassing agents which can be used are carbonate, bicarbonate and oxalate salts, such, for example, as ammonium carbonate and bicarbonate, which liberate carbon dioxide on heating.

An important feature of the filament-wound support tubes of this invention is the improved smoothness of the interior surface. Under the high operating pressures of reverse osmosis processes the semi-permeable membrane is forced against the interior surface of the support tube. Any defects in the interior surface of the support tube tend to damage the fragile membrane. The known state-of-the-art tubes, such as disclosed in U.S. Pat. No. 3,457,170, contain an interior ply of longitudinally oriented filaments impregnated with a minimum amount of resin to provide sufficient porosity. In the process of preparation of these tubes, longitudinal filaments are not forced against the mandrel by their tension, as are helically wound filaments, and the longitudinal strands are impregnated after being placed on the mandrel. Because of the method of manufacture of the state-of-the-art tube discussed above, the interior surface of these tubes is not completely smooth. The reverse osmosis membrane is forced against the irregular surface under reverse osmosis pressures causing rapid membrane failure.

The interior plies of the support tubes of this invention are helically wound under tension forcing intimate contact of the filaments with the mandrel. The filaments are well coated with resin by being drawn through a resin bath just prior to winding and adjacent filaments are closely bonded together to give a smooth interior surface.

The high resin content, of at least about 20–30 percent by weight, of the filament-wound reverse osmosis support tubes of this invention improves the strength of the composite structure. As the resin content decreases below about 20 percent by weight, the strength of the tube is adversely affected. As the resin content increases above 30 percent, the porosity of the tubes becomes insufficient for effective use. The initial burst strength of the improved tube is in the order of about 11,000 p.s.i. which is sufficient to enable these support tubes to operate under reverse osmosis pressures of about 1,000–1,500 p.s.i., such as those required for one-stage desalination of sea water.

Glass fibers are subject to degradation when exposed to a water environment. This degradation is due to oxides, particularly alkali oxides, leaching from the glass in the presence of water in the form of hydroxides. The resin matrix of the filament-wound support tubes of this invention protects the glass filaments from such degradation. However, thermoset composites are known to suffer stress-cracking of the resin matrix, and when this occurs the filaments are exposed to water. To further protect the glass filaments from such degradative attack the glass filaments can be precoated with a glass finish which is compatible with the resin bonding matrix system. A protective coating of a hydrophobic polymer provides this protection. Suitable polymers include epoxides, phenolics, polyesters, vinylidene chloride-vinyl chloride copolymers, polyphenylene oxide, ethylene-propylene copolymers, chlorinated polypropylene, silicone and silicone-epoxy resins.

We claim:

1. An improved porous resin-bonded filament-wound support tube for membranes employed in reverse osmosis processes, said tube being in the form of a cured composite structure and comprising:
   a. a plurality of interior plies of helical filament windings impregnated with a thermosetting resin matrix, said helical windings being at an angle of between about 80° and about 90° with respect to the longitudinal axis of the support tube;
   b. at least one longitudinal ply comprising a plurality of filaments oriented substantially parallel to the longitudinal axis of said tube, said filaments being impregnated with a thermosetting resin matrix and overlaying the interior plies; and
   c. a plurality of outer plies of helical filament windings impregnated with a thermosetting resin matrix and overlaying said longitudinal ply, said outer plies making an angle of between about 80° and about 90° with respect to the longitudinal axis of the support tube; said support tube containing at least about 20–30 percent by weight of thermosetting resin.

2. The improved support tube of claim 1 wherein the helical windings of the interior and exterior helical plies are at an angle of substantially 90° with respect to the longitudinal axis.

3. The improved support tube of claim 1 wherein the filament material is selected from the group consisting of glass, carbon or graphite fibers.

4. The improved support tube of claim 1 in which the filaments are prepared from glass.

5. The improved support tube of claim 1 wherein a gassing agent which will decompose at curing temperatures to produce a gaseous decomposition product is incorporated in the thermosetting resin used to impregnate said interior helical plies.

6. The improved support tube of claim 2 wherein the filaments are prepared from glass and wherein a gassing agent which will decompose at curing temperatures to produce a gaseous decomposition product is incorporated in the thermosetting resin used to impregnate said interioe helical plies.

7. A reverse osmosis assembly comprising the filament-wound support tube of claim 1 and a semipermeable osmotic membrane supported on the interior surface of said tube.

8. A method of producing an improved porous resin-bonded filament-wound support tube for membranes employed in reverse osmosis processes comprising the steps of:
   a. drawing filaments through a bath of thermosetting resin, spreading the resin-wet filaments and helically winding them around a mandrel at an angle of between about 80° and about 90° with respect to the longitudinal axis of the mandrel to form a plurality of interior plies;
   b. circumferentially placing around the interior plies a longitudinal ply comprising a plurality of filaments oriented substantially parallel to the longitudinal axis of the mandrel and impregnating the longitudinal ply with thermosetting resin;
   c. overlaying the longitudinal ply with a plurality of plies by drawing filaments through a bath of thermosetting resin and winding the resin-coated filaments around the longitudinal ply at an angle of between about 80° and about 90° with respect to the longitudinal axis to form the outer plies; and
   d. curing the thermosetting resin to form a resin-bonded unitary composite tube containing at least about 20–30 percent by weight of thermosetting resin.

9. The process of claim 8 wherein the helical windings of the interior and exterior helical plies are at an angle of substantially 90° with respect to the longitudinal axis.

10. The process of claim 8 wherein the filament material is selected from the group consisting of glass, carbon, or graphite fibers.

11. The process of claim 8 in which the filaments are prepared from glass.

12. The process of claim 8 wherein a gassing agent which will decompose at curing temperatures to produce a gaseous decomposition product is incorporated in the thermosetting resin used to impregnate said interior helical plies.

13. The process of claim 8 wherein the filaments are prepared from glass and wherein a gassing agent which will decompose at curing temperatures to produce a gaseous decomposition product is incorporated in the thermosetting resin used to impregnate said interior helical plies.

* * * * *